US009542933B2

(12) United States Patent
Mortensen (10) Patent No.: US 9,542,933 B2
(45) Date of Patent: Jan. 10, 2017

(54) MICROPHONE CIRCUIT ASSEMBLY AND SYSTEM WITH SPEECH RECOGNITION

(71) Applicant: ANALOG DEVICES GLOBAL, Hamilton (BM)

(72) Inventor: Mikael Mortensen, Kgs. Lyngby (DK)

(73) Assignee: Analog Devices Global, Hamilton (BM)

( * ) Notice: Subject to any disclaimer, the term of this patent is extended or adjusted under 35 U.S.C. 154(b) by 756 days.

(21) Appl. No.: 13/789,847

(22) Filed: Mar. 8, 2013

(65) Prior Publication Data

US 2014/0257813 A1 Sep. 11, 2014

(51) Int. Cl.
| | |
|---|---|
| *G10L 15/04* | (2013.01) |
| *G10L 15/02* | (2006.01) |
| *G10L 15/22* | (2006.01) |
| *H04R 3/00* | (2006.01) |
| *G10L 15/28* | (2013.01) |
| *G10L 15/06* | (2013.01) |

(Continued)

(52) U.S. Cl.
CPC ............. *G10L 15/02* (2013.01); *G10L 15/22* (2013.01); *G10L 15/28* (2013.01); *H04R 3/00* (2013.01); *G10L 15/063* (2013.01); *G10L 15/08* (2013.01); *G10L 15/265* (2013.01); *H04R 2225/43* (2013.01)

(58) Field of Classification Search
CPC ........ G10L 15/22; G10L 15/265; G10L 15/30; G10L 15/08; G10L 15/20; G10L 15/02; G10L 15/10; G10L 15/12; G10L 15/063; G10L 25/78
USPC ............... 704/231, 251, 275, 233, 236, 237, 238,704/239, 240, 246, 270
See application file for complete search history.

(56) References Cited

U.S. PATENT DOCUMENTS

| | | |
|---|---|---|
| 6,427,134 B1 | 7/2002 | Garner et al. |
| 6,993,483 B1 | 1/2006 | Milner |

(Continued)

FOREIGN PATENT DOCUMENTS

| | | |
|---|---|---|
| EP | 0 871 157 A2 | 10/1998 |
| WO | 00/22610 | 4/2000 |

OTHER PUBLICATIONS

Chen, J., et al: "Robust MFCCs Derived from Differentiated Power Spectrum," ATR Spoken Language Translation Research Laboratories, Kyoto, 619-0288, Japan and School of Microelectronic Engineering, Griffith University Brisbane, QLD 4111, Australia.

(Continued)

*Primary Examiner* — Vu B Hang
(74) *Attorney, Agent, or Firm* — Schwegman Lundberg & Woessner, P.A.

(57) ABSTRACT

A microphone circuit assembly for an external application processor, such as a programmable Digital Signal Processor, may include a microphone preamplifier and analog-to-digital converter to generate microphone signal samples at a first predetermined sample rate. A speech feature extractor is configured for receipt and processing of predetermined blocks of the microphone signal samples to extract speech feature vectors representing speech features of the microphone signal samples. The microphone circuit assembly may include a speech vocabulary comprising a target word or target phrase of human speech encoded as a set of target feature vectors and a decision circuit is configured to compare the speech feature vectors generated by the speech feature extractor with the target feature vectors to detect the target speech word or phrase.

38 Claims, 4 Drawing Sheets

(51) Int. Cl.
G10L 15/08 (2006.01)
G10L 15/26 (2006.01)

(56) References Cited

U.S. PATENT DOCUMENTS

| | | |
|---|---|---|
| 7,418,392 B1 * | 8/2008 | Mozer et al. ................. 704/275 |
| 2003/0101051 A1 | 5/2003 | Raj et al. |
| 2003/0110033 A1 | 6/2003 | Sheikhzadeh-Nadjar et al. |
| 2005/0049877 A1 | 3/2005 | Agranat |
| 2007/0265848 A1 | 11/2007 | Chaudbari et al. |
| 2008/0267416 A1 | 10/2008 | Goldstein |
| 2010/0004766 A1 | 1/2010 | Feng et al. |
| 2010/0332668 A1 | 12/2010 | Shah |
| 2011/0276157 A1 * | 11/2011 | Wang et al. .................... 700/94 |

OTHER PUBLICATIONS

Filali, et al: "Algorithms for Data-Driven ASR Parameter Quantization," Oct. 31, 2003.
Mark D. Skowronski and John G. Harris: "Increased MFCC Filter Bandwidth for Noise-Robust Phoneme Recognition," ICASSP'02, vol. I, pp. 801-804, ISBN: 0-7803-7403-7.
Meseguer, Noelia Alcaraz: "Speech Analysis for Automatic Speech Recognition," Jul. 2009.
"MFCC Quantisation in Distributed Speech Recognition," pp. 295-353.
Wada et al.: 'A Real Time Noise-Robust Speech Recognition System', ECTI Nov. 2005.

* cited by examiner

MICROPHONE CIRCUIT ASSEMBLY AND SYSTEM WITH SPEECH RECOGNITION

The present invention relates in one aspect to a microphone circuit assembly for connection to an external application processor such as a programmable Digital Signal Processor. The microphone circuit assembly comprises a microphone preamplifier and analog-to-digital converter to generate microphone signal samples at a first predetermined sample rate. A speech feature extractor is configured for receipt and processing of predetermined blocks of the microphone signal samples to extract speech feature vectors representing speech features of the microphone signal samples. The microphone circuit assembly additionally comprises a speech vocabulary comprising a target word or target phrase of human speech encoded as a set of target feature vectors and a decision circuit is configured to compare the speech feature vectors generated by the speech feature extractor with the target feature vectors to detect the target speech word or phrase. A controller is configured to generate a recognition signal on an externally accessible output terminal of the microphone circuit assembly in response to a recognized target word or phrase in the microphone signal samples. Additional aspects of the invention relates to Digital Signal Processing Systems comprising the microphone circuit assembly.

BACKGROUND OF THE INVENTION

In speech recognition system, the first filter bank applied to an incoming speech signal, typically generated by a microphone mounted in a piece of portable communication equipment like in a phone, a toy, a TV set or PC etc., is normally a variant of a Mel Factor Cepstral/Cepstrum Coefficient (MFCC) filter bank, disregarding whether an underlying speech recognition system is based on neural nets (NN), Hidden Markov Models (HMM), or factor graphs (FG). The purpose of the complete speech recognition system is to provide voice activated control over device functions such as device wake-up or power-on from a sleep-mode. However, MFCC filter banks of known speech recognition devices and systems are computationally complex and for this reason often executed on a programmable application processor such as a programmable fixed or floating point DSP core or engine. These types of DSP cores often use 24 or 32 bit word lengths for representation for incoming speech/audio signal samples leading to datapath circuits, data registers and logic with correspondingly large word lengths to accommodate the word format of the incoming audio samples. This feature leads to high power consumption in the MFCC filter bank during processing of the incoming speech or audio signal which is a significant problem or obstacle for the application of MFCC based speech recognition in portable/battery powered equipment.

Furthermore, since the speech recognition application or program traditionally executes on the programmable external application processor, e.g. a DSP core, it has to continuously reside in an active mode of operation to detect the presence of the target word, phrase or command in the incoming microphone signal. This requirement for continuous operation of the programmable external application processor presents an obstacle for providing voice activated system power up due to high power consumption of the continuously operating programmable application processor. The high power consumption is a significant problem for the speech recognition application in both battery powered portable equipment and mains connected electrical equipment in view of battery life-time and the on-going worldwide efforts to reduce energy consumption of electrical equipment throughout the industrialized world. Hence, it would be of considerable benefit to provide a separate microphone circuit assembly comprising a speech recognition unit with low power consumption and capable of operating independently of the external application processor. The microphone circuit assembly could comprise a speech recognition unit capable of recognizing one or more predetermined target word(s) or phrase(s) and indicating the recognition of such target word(s) or phrase(s) to the external application processor by transmission of a suitable recognition signal. Hence, such a microphone circuit assembly will allow the external application processor to reside in sleep-mode without processing of the microphone signal by delegating the recognition task of the target word or phrase in the incoming microphone signal to the microphone circuit assembly. The microphone circuit assembly may indicate the recognition of the target word or phrase to the external application processor by a suitable recognition signal allowing the application processor to switch from the sleep-mode to an active mode and take appropriate action in response.

EP 0 871 157 A2 discloses a speech recognition method and apparatus. The speech recognition device receives its input speech signal s(n) from a microphone. The speech signal is transformed into a digital form by means of an ND converter using a sampling frequency of 8 kHz and 12 bits of resolution per sample. The speech recognition device comprises a front-end where the speech signal is analyzed and a feature vector is modeled. The feature vector may be modeled by defining Mel-Frequency Cepstral Coefficients (MFCC).

U.S. 2003/110033 A1 discloses a method and system for real-time speech recognition. The speech recognition is based on the MFCC algorithm and Hidden Markov Models (HMM). The speech recognition system may be implemented on a DSP suitable for a low resource environment. A WOLA filter bank is working as co-processor to a DSP core and applies a 256 point FFT to consecutive or running segments of the digitized input speech signal.

The paper 'A Real Time Noise-Robust Speech Recognition System', Wada et al., ECTI November 2005 discloses a speech recognition method and apparatus based on custom hardware such as a full-custom ASIC design or a FPGA design. A speech recognition device is based on a FPGA board. Speech input signals to the speech recognition device on the FPGA board are generated by sampling a microphone signal by an ND converter with a sampling rate of 11.025 kHz quantizing speech samples to 12-bits word length.

SUMMARY OF INVENTION

A first aspect of the invention relates to a microphone circuit assembly for an external application processor, comprising:
a microphone preamplifier comprising an input terminal for receipt of a microphone signal,
an analog-to-digital converter configured for receipt of an output signal of the microphone preamplifier and generation of corresponding microphone signal samples having a first predetermined number of bits at a first predetermined sample rate,
a speech feature extractor configured for receipt and processing of predetermined blocks of the microphone signal samples to extract speech feature vectors representing speech features of the microphone signal samples, a speech vocabulary comprising a target word or target phrase of human speech encoded as a set of target feature vectors, a controller comprising a decision circuit configured to compare the speech feature vectors generated by the speech feature extractor with the target feature vectors to detect the target speech word or phrase, the controller being configured to generate a recognition signal on an externally accessible output terminal in response to a recognized target word or phrase in the microphone signal samples.

The present microphone circuit assembly has numerous uses for providing speech control of electronic equipment via the microphone audio input available through the input terminal. The electronic equipment may comprise portable terminals and equipment, toys, TV sets etc. The microphone circuit assembly is preferably sized and shaped to be accommodated inside a housing of a miniature ECM or integrated with a package of MEMS condenser microphone. In the latter embodiment, speech recognition features are added to the traditional sound capture capabilities of miniature ECM or MEMS microphones opening for a new range of voice controlled applications. In some particularly advantageous applications of the invention, the recognition signal supplied at the externally accessible output terminal of the microphone circuit assembly is utilized for activation or power-up of the external application processor such as a programmable or hard-wired Digital Signal Processor (DSP) or microprocessor of a Digital Signal Processing System as described in further detail below. This feature allows the external application processor to reside in a power savings mode such as a power-down or sleep-mode without processing of the incoming microphone signal until receipt of the recognition signal. The sleep-mode of the external application processor is preferably a mode where the clock signal to a core of the external application processor is interrupted and/or DC supply voltage to the core of the external application processor is removed or interrupted. The interruption of the clock signal to the core of the external application processor may be controlled by a clock gating circuit and reduces dynamic power dissipation of the core. The DC supply voltage to the core of the external application processor may be removed or interrupted by suitable logic to reduce static power dissipation of the core. The Digital Signal Processing system may be incorporated in the previously discussed portable terminals and equipment, toys, TV sets etc.

In other useful applications of the invention, the speech recognition capability of the present microphone circuit assembly functions as a pre-filter for a running speech recognition application on the external application processor such that two independent speech recognition mechanisms are running simultaneously in the system. The speech recognition application of the external application processor may be configured to solely process speech segments flagged or indicated by the speech recognition function of the microphone circuit assembly via the recognition signal as comprising target words and/or phrases. In this manner, the speech recognition application executed on the external application processor can discard the processing of large amounts of incoming microphone signal samples supplied by the microphone circuit assembly. This feature leads to a beneficial reduction of computational load and power consumption of the external application processor.

The speech feature extractor and the decision circuit cooperate to enable speech recognition in the present microphone circuit assembly. The target word or phrase may be a single word, a single phrase or a single or several words of a short sentence or command. In the latter embodiment, the length of the sentence is preferably limited to a few target words or phrases to limit memory usage of the speech vocabulary. The short command may comprise an activation or wake-up command like 'turn on' or 'power up' etc. in the relevant language. The speech vocabulary may comprise a plurality of target words, phrases or entire commands or sentences providing additional or alternative commands to the above-described activation or wake-up command.

The skilled person will appreciate that characteristics of the recognition signal generated by the controller and transmitted via the externally accessible output terminal can vary for example depending on characteristics of a surrounding DSP system, in particular characteristic (e.g. certain level and impedance requirements) of an input port or pad of an associated external application processor coupled to the recognition signal. A logic state transition or a change of logic level of the recognition signal may for example indicate the recognition of the target word or phrase. The recognition signal may of course use more complex binary coded data patterns or commands to indicate the recognition of the target word or phrase.

A preferred embodiment of the microphone circuit assembly comprises a data communication interface for transmission of the microphone signal samples to an external application processor. The data communication interface may comprise one or more pads or terminals of the microphone circuit assembly. This embodiment is particularly useful when the microphone circuit assembly is embedded in systems which comprise other types of sound processing capabilities or features in addition to the above-discussed mere speech recognition. According to this embodiment the present microphone circuit assembly may function as a digital microphone front-end or preamplifier providing digitized microphone sound in numerous applications such as smartphones, headsets, cameras, sound recorders, etc. in addition to speech recognition. The skilled person will understand that the data communication interface may comprise an industry standard serial digital audio interface such as $I^2S$ or a customized serial data interface e.g. based on proprietary PDM encoding of the microphone signal samples. Alternative embodiments of the data communication interface may comprise an industry standard bi-directional data interface such as serial interfaces like SLIMbus, SPI, $I^2C$, etc. The latter types of the data communication interfaces may be configured to transmit both the microphone signal samples and the recognition signal to the external application processor such that the externally accessible output terminal for transmission of the recognition signal is an integral part of the data communication interface. In the latter embodiment, the recognition signal may be a predefined data command encoded in accordance with a protocol of the proprietary or industry standard bi-directional data interface.

Despite the presence of a data communication interface on the microphone circuit assembly, the recognition signal may be transmitted via an independent separate data terminal or pad outside the data communication interface for reasons discussed below in connection with system integration considerations of the present microphone circuit assembly.

According to another preferred embodiment of the microphone circuit assembly the microphone preamplifier and analog-to-digital converter are operative in at least a first power mode and a second power mode. The first power mode has a first power consumption and the microphone signal samples are generated at the first predetermined sample rate with a first dynamic range. The second power mode has a second power consumption and the microphone signal samples are generated with a second dynamic range at a second predetermined sample rate. The second dynamic range is larger than the first dynamic range and the second power consumption is larger than the first power consumption. This embodiment allows the microphone circuit assembly to be operated at different microphone signal quality or performance levels with corresponding power consumption levels depending on a system state. The first power mode may be a low-power mode or reduced performance mode of the microphone circuit assembly suitable for wake-up system applications as discussed above. The controller of the microphone circuit assembly may be configured to switch from the first power mode to the second power mode in response to the recognition of the target word or phrase. In a preferred embodiment, the controller is further adapted to initiate transmission of the microphone signal samples through the data communication interface in response to the recognized target word or phrase. Hence, the microphone circuit assembly may be configured to interrupt the transmission of the microphone signal samples in the first power mode to minimize power consumption.

The second power mode may be a nominal performance mode in which the microphone signal samples are generated with a larger dynamic range and/or higher sampling rate than in the first power mode/low-power mode albeit at the expense of increased power consumption of the microphone preamplifier and analog-to-digital converter. A low power consumption of the microphone circuit assembly while the associated external application processor and system reside in sleep-mode awaiting the predetermined target word or phrase to wake-up and switch to normal operation represents one distinct advantage of this switchable power mode feature for voice activated system power-up applications. The lower performance of the microphone preamplifier and analog-to-digital converter in the first power mode do on the other hand not impair the quality or fidelity of the digitized microphone signal during normal operation of the system. The normal system operation typically comprises processing of the microphone signal samples by the external application processor, because the microphone preamplifier and analog-to-digital converter are switched to the second/nominal performance mode leading to improved dynamic range and signal quality/fidelity. Despite operation in the second power mode leads to increased power consumption of the microphone circuit assembly, the effect may be largely inconsequential for many system configurations or set-ups because the external application processor, e.g. a high-speed programmable DSP, is likely to be a dominant source of system power consumption during normal system operation.

The skilled person will understand that selection of the first and second dynamic ranges of the microphone signal samples will depend on specific requirements of a particular application. Since the power consumption of the microphone preamplifier and analog-to-digital converter tend to increase with increasing dynamic range and with increasing sample rate or frequency, it may be desirable to keep both dynamic range and sample rate as small as possible within given sound quality constraints. According to one embodiment of the microphone circuit assembly the first dynamic range of the microphone signal samples is smaller than 72 dB, preferably smaller than 66 dB, for example smaller than 60 dB. In this context, the dynamic range is measured as a signal to noise ratio plus THD (S/N+THD) of the microphone signal samples with a 1 kHz full scale microphone input signal relative to an A-weighted noise level of the microphone signal samples with AC-shorted input terminal of the microphone preamplifier.

This embodiment is well-suited for the previously discussed wake-up functionality because the 72 dB or less dynamic range is tailored to the noise characteristics of the microphone signal delivered by ordinary miniature ECMs or miniature condenser microphones. In this manner, the number of bits or dynamic range of the speech feature extractor which may include complex filter banks can be significantly reduced compared to ordinary application programs executed on programmable DSP devices. The 72 dB or less dynamic of the microphone signal samples may be adequately represented by signal samples on 11 bits or less. This is in contrast to the 16 bits-24 bits, or even 32 bits, representation of microphone signal samples in speech recognition applications of programmable DSP devices.

The second dynamic range of the digital microphone signal may vary depending on application requirements, but is preferably markedly larger than the first dynamic range, for example at least 10 dB larger, to provide a clear audible improvement of the microphone signal quality. The second dynamic range may therefore be larger than 82 dB, or larger than 90 dB, if the first dynamic range is about 72 dB.

To keep power consumption of the analog-to-digital converter low in the first power mode, the converter may be configured to generate the microphone signal samples with a sample rate between 8 and 16 kHz such that the bandwidth of incoming speech signals remains sufficiently large to capture important speech features and thereby provide good speech recognition despite being too low to provide optimal fidelity of the digitized microphone signal for some types of applications like live music recording. However, the relaxed power consumption constraints in the second power mode will often allow an increase of the sample rate of the microphone signal samples generated by the analog-to-digital converter for example to a sample rate that equals or exceeds 32 kHz. The sample rate may indeed be increased to one of the standardized digital audio sampling frequencies like 44.1 kHz, 48 kHz, or 96 kHz to capture the entire audio frequency spectrum of the digitized microphone signal.

The first and second power modes of the microphone circuit assembly may be provided by various programming mechanisms. A preferred embodiment of the microphone circuit assembly comprises a configuration register which is writeable from the external application processor via the data communication interface. The controller may be configured to read the configuration data transmitted from the external application processor, extract and select parameter values associated with the programmable setting of one or more of the microphone preamplifier, analog-to-digital converter and speech feature extractor. Thereafter, the controller may write appropriate parameter values to appropriate addresses of the configuration register to select one of the first power mode and the second power mode. In this embodiment, the configuration register comprises parameter values controlling programmable settings of at least one of {the microphone preamplifier, the analog-to-digital converter, the speech feature extractor}. The controller is configured for receipt of configuration data comprising the parameter values through the data communication interface. This feature allows the external application processor to set and/or modify one or more of the respective programmable settings of the microphone preamplifier, analog-to-digital converter and speech feature extractor in accordance with system requirements. The external application processor may for example at system power-on, or boot time, be configured to write configuration data with parameter values that define the first power mode and the second power mode to the configuration register. In this manner, the first power mode and the second power mode may be tailored to specific systems requirement by the external application processor in a highly flexible manner. In alternative embodiments, the content of the configuration register may be determined by the controller alone for example by reading pre-stored parameter values from a non-volatile memory area of the microphone circuit assembly. In the latter embodiment, the controller may accordingly be adapted to define the first and second power modes by writing appropriate parameter values to the configuration register or modify existing parameter values stored in the configuration register.

Yet another preferred embodiment of the microphone circuit assembly comprises a circular speech data buffer configured for storage of consecutive speech segments representing predetermined time periods of the microphone signal samples. The circular speech data buffer may reside in a suitable data memory area or segment of the microphone circuit assembly such as a register file or SRAM data memory area. The size or capacity of the circular speech data buffer varies according to its intended application. In some embodiments, the circular speech data buffer functions only as a temporary storage area for the speech feature extractor allowing blocks of microphone signal samples to be accumulated and temporarily stored before subsequent processing in a block based filter bank algorithm such as a MFCC filter bank. In these embodiments the circular speech data buffer may be sized to hold between 256 and 1024 microphone signal samples. In other embodiments, the circular speech data buffer has capacity to hold relatively large consecutive segments of the microphone signal samples for example microphone signal samples representing a time period larger than one of 500 ms and 1 second. These time periods correspond to 8.000 and 16.000 microphone signal samples, respectively, at a sample rate of 16 kHz. The large storage capacity of the circular speech data buffer is utilized in advantageous embodiment of the invention where the controller is configured to, in response to a recognized target word or target phrase, transmitting a speech segment comprising the recognized target word or phrase from the circular speech data buffer to the external application processor through the data communication interface. This feature allows the external application processor to perform an independent verification of the presence of the target word or a target phrase in the transmitted speech segment for example by execution of a suitable speech recognition application or program leading to numerous benefits as described below in connection with the preferred embodiments of the invention.

The microphone circuit assembly may comprise a floating point converter operatively coupled between an output of the analog-to-digital converter and an input of the speech feature extractor. The floating point converter is preferably configured for converting microphone signal samples from a binary fixed point format into one of a proprietary and standardized binary floating point format for application to the speech feature extractor. The format of the decimated multi-bit microphone signal samples is preferably a binary fixed-point format such as two's complement, binary off-set etc. Hence, the floating point converter may be configured to convert the microphone signal samples from the binary fixed point format into a proprietary or standardized binary floating point format before processing in the speech feature extractor. The binary floating point format preferably represents numbers using a small number of bits for example a mantissa represented by 16 bits or less and an exponent represented by 6 bits or less. One such embodiment uses the 16 bit half-precision standardized binary floating point format according to IEEE 754-2008. The representation of the microphone signal samples in binary floating point format in the speech feature extractor is a highly effective mechanism for reducing its power consumption in numerous filter bank based implementations such as MFCC filter banks. This is due to the large dynamic range of internal signals of the filter bank caused by block based FFT/iFFT operations with notorious high internal gain factors. Hence, the floating point format is capable of representing these high dynamic range internal signals with a markedly smaller number of bits than a fixed point format.

The speech feature extractor preferably comprises a perceptually motivated filter bank or a Linear Predictive Coding (LPC) analyser. The skilled person will appreciate that filter bank based speech feature extractors may comprise numerous types of either proprietary or standardized perceptually motivated filter banks such as the previously discussed Mel Factor Cepstrum Coefficient (MFCC) filter bank or a bark scale Cepstrum Coefficient filter bank.

An advantageous embodiment of the present microphone circuit assembly is fully embedded on a single integrated semiconductor die or substrate such that the externally accessible output terminal comprises a first pad of the integrated semiconductor die and the input terminal comprises a second pad of the integrated semiconductor die. The integrated semiconductor die or substrate may be fabricated by ordinary semiconductor processes such as 0.35 µm, 0.18 µm or 0.065 µm CMOS or BiCMOS. This embodiment of the microphone circuit assembly is accordingly a self-contained circuit assembly separate from the external application processor that may be integrated on a separate semiconductor die. The first pad of the integrated semiconductor die carries the recognition signal to the external application processor while the second pad of the integrated semiconductor die is suited for coupling to a microphone transducer element for receipt of a microphone signal. One embodiment of the present microphone circuit assembly is shaped and sized to be accommodated inside a housing of a miniature ECM or integrated with a package of MEMS condenser microphone.

A second aspect of the invention relates to a Digital Signal Processing system mounted on a carrier substrate. The Digital Signal Processing system or DSP system comprises a microphone circuit assembly according to any of the above-described embodiments thereof. The DSP system further comprises a programmable Digital Signal Processor (DSP) comprising a program memory space for storage of respective sets of executable program instructions of a plurality of predetermined application programs. A data memory space is configured for storage of program variables and constants. The programmable Digital Signal Processor additionally comprises a recognition detector operatively connected to the output terminal of the microphone circuit assembly through the carrier substrate for receipt of the recognition signal. The recognition detector is operatively configured to issue one of a predetermined command or a predetermined application program in response to the recognition signal. The skilled person will understand that the programmable DSP is an exemplary embodiment of the previously discussed external application processor. The external application processor may in the alternative embodiments comprise a general purpose microprocessor with or without certain DSP oriented computing enhancements. The programmable DSP may comprise readable and writable non-volatile memory for permanent storage of the sets of executable program instructions and the program constants. The readable and writable non-volatile memory may be integrated with the programmable DSP on a common semiconductor die and/or arranged on a separate memory circuit with an appropriate memory interface to the programmable DSP. The non-volatile memory preferably comprises memory elements selected from a group of EPROM, EEPROM, flash memory, etc.

The carrier substrate may comprise a single-layer or multi-layer printed circuit board, ceramic substrate etc. The recognition signal is preferably received by the programmable DSP via an externally accessible interface pad. The characteristics of the externally accessible interface pad may vary depending on existing pad and data interface resources of the programmable DSP. In some embodiments the externally accessible interface pad forms part of a bi-directional or unidirectional data communication interface of the programmable DSP where the data communication interface is configured for receipt of microphone signal samples transmitted by the microphone circuit assembly subsequently to issuance of the recognition signal. In alternative embodiments of the programmable DSP, the externally accessible interface pad comprises a general purpose input-output (GPIO) port or an interrupt request port of the programmable DSP such that the recognition detector is operatively connected to one of these ports. The recognition detector may be responsive to a logic state or logic state transition of the externally accessible interface pad. These embodiments will typically lead to a simplification of the interface between the microphone circuit assembly and the programmable DSP and allow the latter to reside in the sleep-mode while awaiting the recognition signal from the microphone circuit assembly. On the other hand, a separate data communication channel between the microphone circuit assembly and the programmable DSP must be established in order to subsequently receive the previously discussed microphone signal samples representing the speech segment with the recognized target word or phrase, or other types of audio or control data for that matter. However, if the sole task of the microphone circuit assembly in the DSP system is to wake-up the programmable DSP when the target word or phrase is recognized, the separate data communication channel may be superfluous.

If the externally accessible interface pad forms part of the data communication interface of the programmable DSP, the data communication interface may receive the recognition signal encoded as the previously discussed predefined data signal or command from a mating or compatible data communication interface of the microphone circuit assembly. The data communication interface of the programmable DSP may comprise a proprietary or industry standard unidirectional or bi-directional data interface. The industry standard bi-directional data interface may comprise well-known serial data interfaces like SLIMbus, SPI, I²C, etc. The embodiments of the programmable DSP which comprise the data communication interface for receipt of the recognition signal provide a very flexible mechanism for receipt of the recognition signal and preferably also for receipt of the subsequently transmitted microphone signal samples from the microphone circuit assembly. However, using the data communication interface for receipt of the recognition signal may require the programmable DSP to reside in a fully or at least partly operational mode where the DSP remains responsive to events on the data communication interface. Despite being responsive to the events on the data communication interface, the latency of the programmable DSP may be unacceptably long for real-time applications like live microphone signals depending on specific construction details of the data communication interface and its interaction with a core of the programmable DSP. Consequently, these latency and sleep-mode issues may prevent the programmable DSP to enter the previously discussed sleep-mode if the data communication interface is used for receipt of the recognition signal. Furthermore, the transmission of the recognition signal also consumes resources of the data communication interface of the programmable DSP.

The recognition detector may be configured to issue an interrupt command to the programmable DSP to switch the latter from the sleep-mode to an active mode. This can typically be implemented by an appropriate configuration of an interrupt setting or handling register of the programmable DSP. In some instances, interrupt hardware of the programmable DSP may be configured to automatically respond to a rising or falling signal edge of the GPIO port or interrupt request port.

According to another preferred embodiment of the DSP system, the predetermined application program stored in program memory of the programmable DSP comprises a speech recognition application with a set of executable program instructions configured to when executed:
reading and analyzing the received microphone signal samples. This function is useful for numerous applications such as the previously discussed independent verification of the presence of the target word or phrase in the received microphone signal samples leading to the beneficial effects discussed below in detail. The speech recognition application of the programmable DSP may be configured to recognize a plurality of target words and phrases in addition to the target word or phrase of the microphone circuit assembly due to markedly larger computational and memory resources available to the programmable DSP.

The speech recognition application may be further configured to:
if the target word or phrase is recognized in a segment the received microphone signal samples, transmit configuration data to the microphone circuit assembly according to select the second power mode as discussed above. In this manner, the programmable DSP may function as a master device for the microphone circuit assembly controlling the switching between power modes and possibly other programmable characteristics. Hence, when the speech recognition application verifies the presence of the target word or target phrase, the microphone circuit assembly may be switched from the first power mode to the second power mode such that a high fidelity microphone signal is generated by the microphone preamplifier and analog-to-digital converter. On the other hand if the presence of the target word or phrase is not verified by the speech recognition application in the segment of received microphone signal samples, the speech recognition application will preferably not transmit any configuration data to the microphone circuit assembly. In this manner, the microphone circuit assembly will be maintained in the first power mode. The speech recognition application may instead cause the programmable Digital Signal Processor to switch from the active mode to the sleep mode. Hence, false positive recognition results reached by the controller of microphone circuit assembly may be suppressed on a system level.

BRIEF DESCRIPTION OF THE DRAWINGS

Preferred embodiments of the invention will be described in more detail in connection with the append drawings in which.

DESCRIPTION OF PREFERRED EMBODIMENTS

Figure 1:
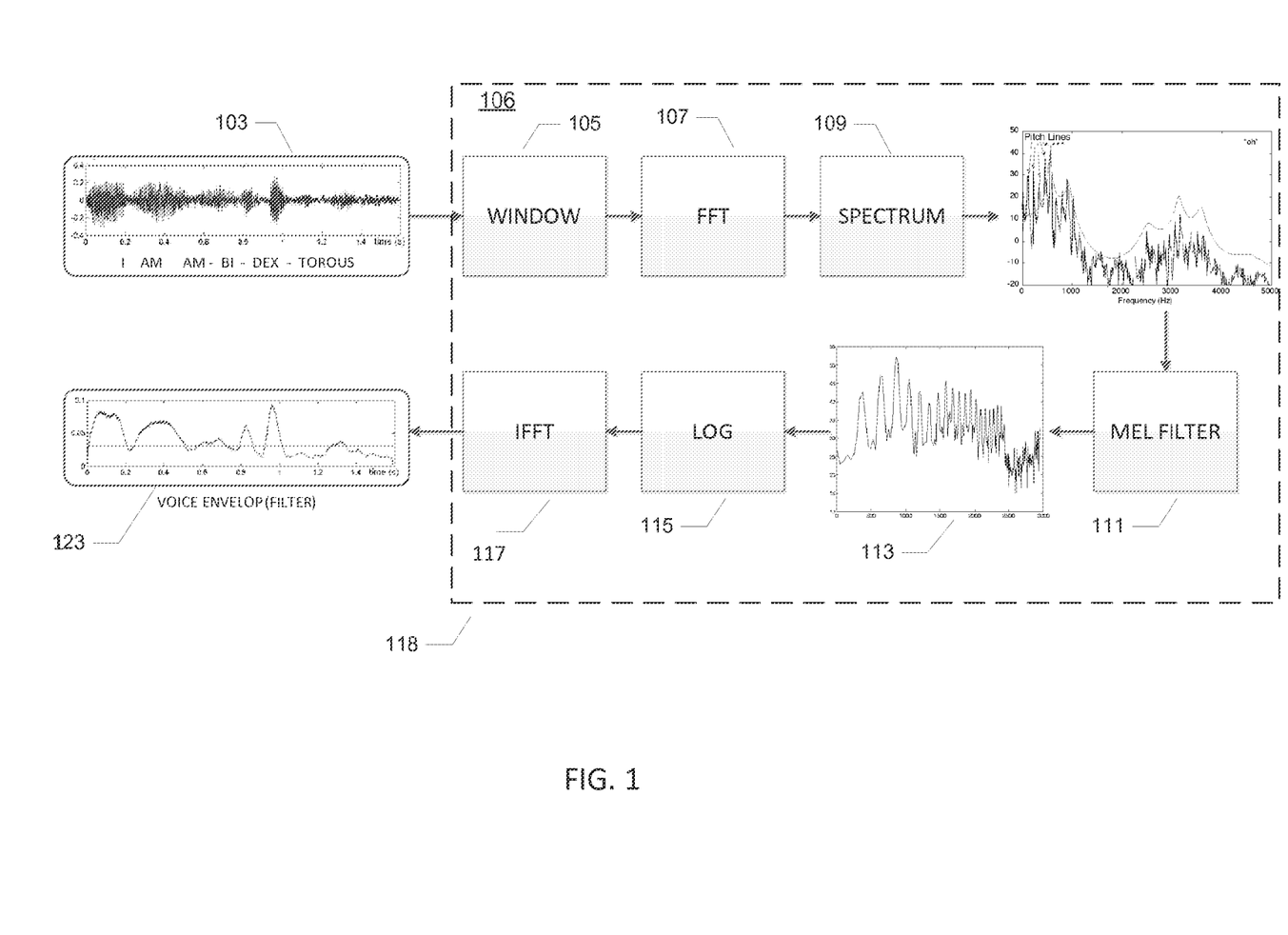
FIG. 1 is a schematic illustration of processing of a speech signal in a Mel Factor Cepstrum Coefficient filter bank.

FIG. 1 is a schematic drawing of speech processing steps in of a speech feature extractor which comprises a perceptually motivated Mel Factor Cepstrum Coefficient (MFCC) filter bank 106. The skilled person will understand that the present speech feature extractor may comprise alternative perceptually motivated filter banks such as a Bark scale bank, or even a customized scale bank, for the extraction of the speech features. Various specific embodiments of these types of perceptually motivated filter banks may be applied in the below described embodiments of the present invention.

A speech segment comprising a short sentence comprising individual words 'I', 'am' and 'ambidextorus' is input to the generic MFCC filter bank 106. A set of digital audio samples representing a portion or block of the speech segment is firstly applied to a suitable window function 105 such as Hanning or Hamming windows. The block size may be 256, 512 or 1024 such that a block comprises 512 or 1024 digital speech samples that are subjected to a FFT processing step with a typical FFT size from 256 to 1024. Consecutive blocks of digital speech samples may be arranged such that the non-overlapped portion of the block corresponds to a 'real' time period of the speech feature that is to be extracted. This real time period of the speech segment is typically between 5- and 20 ms such as 10-15 ms. The frequency domain spectrum of the block is computed in processing step 109 leading to the graphically illustrated exemplary magnitude spectrum. Thereafter, a Mel scale warping filter 111 is applied to the computed magnitude spectrum to map the acquired spectral data to a perceptually relevant frequency scale and obtain a Mel spaced frequency spectrum. A log function processing step 115 is applied to the Mel frequency spectrum and an inverse FTT (IFFT), or IDCT, processing 117 is applied to the Mel frequency spectrum to extract speech feature vectors each preferably comprising one or more Cepstrum, delta Cepstrum or delta-delta Cepstrum coefficients representing speech features of the processed speech segment. The computed or extracted speech feature vectors are utilized by a decision circuit of the below-described microphone circuit assembly 201 to detect word or phrases as described in further detail below.

Figure 2:
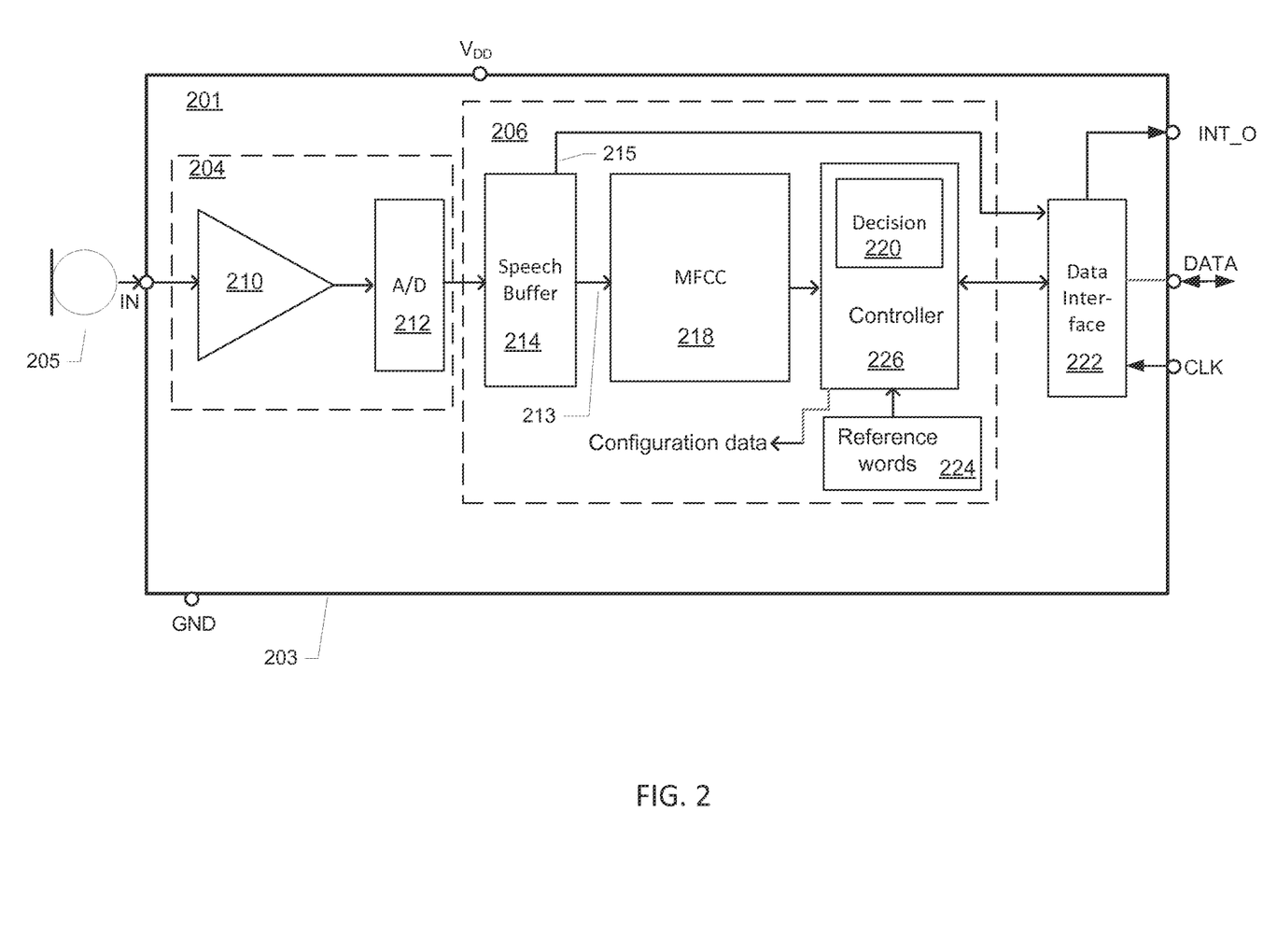
FIG. 2 is a schematic drawing of a microphone circuit assembly in accordance with a first embodiment of the present invention.

FIG. 2 is a schematic drawing of above-mentioned the microphone circuit assembly 201 in accordance with a first embodiment of the present invention. The microphone circuit assembly 201 comprises a mixture of analog and digital signal processing blocks or sub-circuits and digital memory. The skilled person will therefore understand that the microphone circuit assembly 201 may be implemented on two or more separate semiconductor dies or chips for example a first semiconductor die comprising mainly analog circuitry and a second semiconductor die comprising mainly digital logic circuitry including digital memory elements. However, in the present embodiment, the microphone circuit assembly 201 is implemented on a single mixed-signal semiconductor die 203 fabricated in suitable semiconductor processes such as 0.35 µm, 0.18 µm or 0.065 µm CMOS or BiCMOS. The single mixed-signal semiconductor die 203 is preferably shaped and sized to be accommodated inside a housing of a miniature ECM or integrated with a package of MEMS condenser microphone.

The microphone circuit assembly 201 comprises a signal conditioner 204 coupled to a speech recognition unit 206. The signal conditioner 204 comprises a microphone preamplifier 210 coupled to an externally accessible input terminal, IN, for receipt of a microphone signal supplied by a microphone 205. The microphone 205 may comprise a miniature ECM or a miniature MEMS condenser microphone for mobile terminals such as mobile phones, smartphones etc. The microphone preamplifier 210 has preferably extremely large input impedance at audio frequencies to allow direct connection to a condenser transducer element of the miniature ECM or a miniature MEMS condenser microphone. This input impedance may be larger than 1 GΩ. The microphone 205 generates the microphone signal in response to impinging sound, in particular human speech. The signal conditioner 204 further comprises an analog-to-digital converter 212 configured for receipt of an output signal of the microphone preamplifier 210. The microphone preamplifier 210 may be configured to amplify and/or buffer the microphone signal received through the externally accessible input terminal, IN. The analog-to-digital converter 212 is configured to convert the output signal of the microphone preamplifier into corresponding microphone signal samples having a fixed or programmable number of bits such as between 10 and 18 bits. The microphone signal samples are furthermore generated at a fixed or programmable sample rate such as a sample rate between 16 kHz and 48 kHz. The implementation of an analog-to-digital converter with programmable sampling frequency and microphone signal resolution in form of the bit resolution of the microphone signal samples is discussed in detail below in connection with the second embodiment of the present microphone circuit assembly. The microphone signal samples generated at the output of the analog-to-digital converter 212 are temporarily stored in a circular speech data buffer 214 which functions as buffer for the speech recognition unit 206. The circular speech data buffer 214 holds relatively large consecutive segments of the microphone signal samples for the reasons discussed below. The circular speech data buffer 214 may reside in a suitable data memory area or segment of the microphone circuit assembly 201 such as register file or SRAM data memory area. In the present embodiment, the size of the circular speech buffer 214 is sufficiently large to store a segment of digital microphone samples representing a considerable time period for example a time period larger than 500 ms, even more preferably larger than 1 second, of real time speech. These time periods correspond to 8.000 and 16.000 microphone signal samples, respectively, at a sample rate of 16 kHz. In other embodiments, the circular speech buffer 214 may have a considerably smaller size for example only sufficient size to accommodate storage of the required number of microphone signal samples for a certain block size of the (MFCC) filter bank 218 such as the previously discussed block size between 256 and 1024 microphone signal samples. The circular speech data buffer 214 comprises two different outputs of which a first output 213 is coupled to the Mel Factor Cepstrum Coefficient (MFCC) filter bank 218 configured for receipt and processing of blocks of the microphone signal samples to provide speech feature vectors representing speech features of the microphone signal samples. This speech feature vector extraction was described above in connection with FIG. 1. The processing operations performed in the MFCC filter bank 218 are block based as previously described with a preferred block size of between 256 and 1024 microphone signal samples. The speech features generated by the MFCC filter bank 218 are applied to a decision circuit 220, arranged in controller 226, configured to compare the received speech feature vectors with a collection of target feature vectors held in a reference word and phrase vocabulary 224. In the present embodiment, the reference word and phrase vocabulary 224 comprises target feature vector encoding only a few target words or target phrases to minimize the amount of data memory and save semiconductor die area and manufacturing costs. This embodiment is particularly well-adapted for a microphone circuit assembly configured to provide a wake-up function of external equipment and devices. The wake-up function of the present microphone circuit assembly 201 can advantageously be utilized to control an operation mode of an associated external application processor for example an application Digital Signal Processor housed on a shared Digital Signal Processor circuit assembly. To generate a suitable wake-up signal, the controller 226 is configured to generate a recognition signal on the externally accessible output terminal INT_O of microphone circuit assembly 201 in response to the recognition of a target word or target phrase in the microphone signal samples. The controller may transmit the recognition signal through bi-directional data communication interface 222 such that proper I/O adaptation of the recognition signal at the externally accessible output terminal INT_O may be handled by the data interface 222. The skilled person will appreciate that characteristics of this recognition signal can vary depending on the application in question, in particular certain level and impedance requirements of an input port of the associated external application processor coupled to the recognition signal. This system integration related aspect of the invention is discussed in further detail in connection with the description of the Digital Signal Processor system of FIG. 4 below.

The present embodiment of the circular speech data buffer 214 comprises a second output 215 which is coupled to the bi-directional data communication interface 222 or communication interface. The communication interface 222 is configured for transmission of certain portions of the digital microphone samples, for example comprising selected segments of stored speech, to the external application processor such as a programmable Digital Signal Processor (please refer to FIG. 4). A portion of the stored digital microphone samples is transmitted to the external application processor in response to recognition of a target word or a target phrase in the microphone signal samples as indicated by the decision circuit 220 or the controller 226. The portion of transmitted digital microphone samples comprises the recognized target word or a target phrase such that the external application processor is capable of performing an independent verification of the presence of the target word or a target phrase by a suitable speech recognition application program leading to numerous benefits as described below in additional detail. In the present embodiment of the invention, where the microphone circuit assembly 201 is configured as a wake-up processor, the controller 226 may be configured to interrupt any transmission of the stored microphone signal samples from the circular speech buffer 214 to the external application processor until a target word or target phrase is recognized. After the decision circuit 220 has recognized the target word or phrase and notified the application processor through the previously discussed recognition signal INT_DSP, the controller 226 may be adapted to start transmitting generated microphone signal samples immediately after the above-described selected speech segments, representing old microphone signal samples, have been transmitted to the to the external application processor. In this manner, a normal operation mode of the Digital Signal Processor System may be entered with continuous processing of the generated microphone signal samples. In the alternative, the controller 226 may be configured to, after recognition of the target word or phrase and transmission of the recognition signal in response thereto, await an approval signal from the external application processor acknowledging the recognition of the target word or phrase in the transmitted speech segment. Only after receipt of the approval signal will the controller 226 start to transmit the stored microphone signal samples from the circular speech buffer 214 to the external application processor. The approval signal may be transmitted to the controller 226 through the data communication interface 222. This data communication interface 222 is preferably an industry standard type of serial data interface such as I²C, SPI, etc.

In a preferred embodiment of the microphone circuit assembly 201, a dynamic range of the microphone preamplifier 210, analog-to-digital converter 212 and MFCC filter bank 218 in combination is tailored to the noise characteristics of the microphone signal delivered by miniature ECMs or miniature condenser microphones. In this manner, the number of bits or dynamic range of the MFCC filter bank 218 can be significantly reduced compared to ordinary off-the shelf DSP devices where the microphone signal samples often are represented by 16, 24 or even 32 bits at the input of the MFCC filter bank. In one such embodiment, the combination of the microphone preamplifier 210 and analog-to-digital converter 212 is configured to deliver a dynamic range of the microphone signal samples smaller than 72 dB for example smaller than 66 dB where the dynamic range is measured as a signal to noise ratio plus THD of the microphone signal samples with a 1 kHz full scale microphone input signal relative to the A-weighted noise level of the microphone signal samples with AC-shorted input terminal, IN, of the microphone preamplifier 210. Hence, the microphone signal samples may be represented by 12 bits or less (e.g. 11 bits or 10 bits) representation at the input of the MFCC filter bank 218 in accordance with the present invention. The present inventor has realized that these dynamic ranges and corresponding approximate bit representations are sufficient to represent peak values of the incoming speech signal undistorted (e.g. no peak clipping) and deliver speech formants undistorted. In addition, these dynamic ranges are also sufficient to place low level speech cues above a noise floor of the microphone preamplifier 210 and analog-to-digital converter 212 such that onsets of formants are accurately detected.

The microphone signal samples may accordingly be represented by less than 12 bits, or even less than 11 bits, at the input of the MFCC filter bank leading to huge power savings in the MFCC filter bank because of the associated reduction in bit width of datapath circuits, registers, memory etc. Further power reduction may be achieved by using a low sampling frequency or rate for the analog-to-digital converter 212 for example a sampling frequency of 16 kHz or even less. The latter sampling rates will still allow proper recognition of the target words or phrases despite the fidelity of the microphone signal may be less than optimal.

The skilled person will understand that power consumption reduction in the microphone preamplifier 210, analog-to-digital converter 212 and MFCC filter bank 212 is a significant advantage for the application of MFCC based speech recognition to portable/battery powered equipment such as mobile phones. Reduction of the power consumption of the microphone circuit assembly 201 is of course also an pronounced advantage for speech based system wake-up functionality as described above because the signal conditioning and speech recognition hardware included on the microphone circuit assembly 201 must be continuously active to recognize the target words or phrases even when the system or equipment in question resides in sleep-mode.

However, if the above-mentioned constraints of the dynamic range and the sampling frequency of the microphone preamplifier 210, analog-to-digital converter 212 are maintained during normal operation of the microphone circuit assembly 201, i.e. after the wake-up signal has been transmitted to, and acknowledged by, the external application processor, the fidelity or sound quality of the microphone signal samples delivered by the microphone circuit assembly 201 may be unacceptable for some applications due to the limited sampling frequency and dynamic range of the microphone signal samples. The microphone circuit assembly 201 may for example be unable to accommodate the entire dynamic range of the incoming sound in everyday sound environments such that the microphone signal is either distorted at high sound pressure levels and/or noise corrupted at low sound pressure levels. This problem is solved in another advantageous embodiment of the microphone circuit assembly by using switchable power modes of the microphone preamplifier and analog-to-digital converter as described below.

Figure 3:
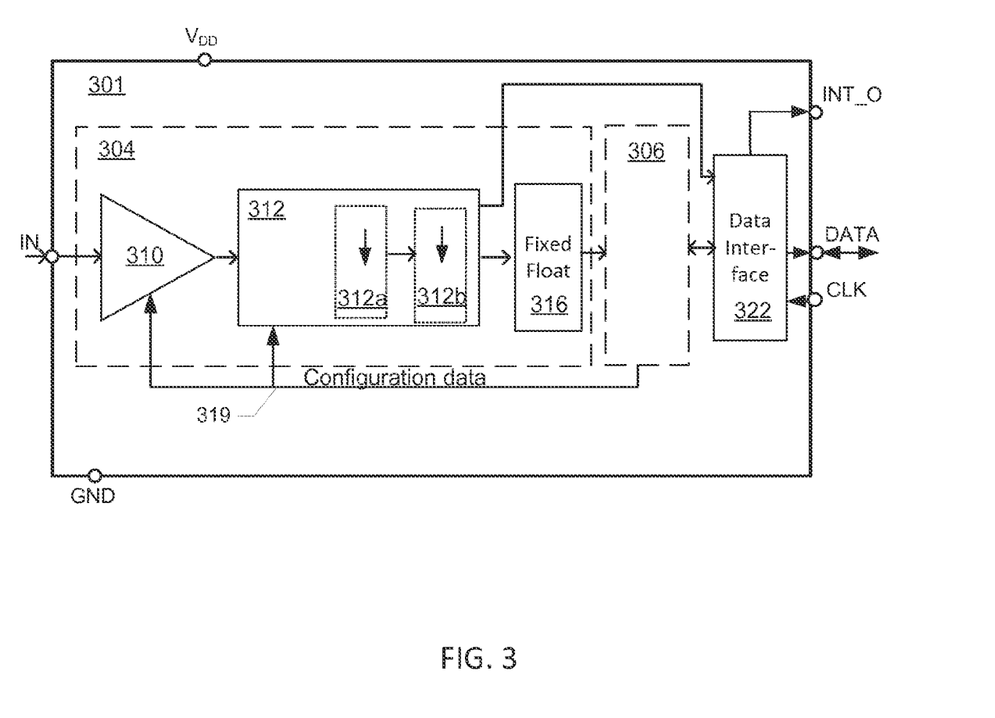
FIG. 3 is a schematic drawing of a microphone circuit assembly in accordance with a second embodiment of the present invention.

FIG. 3 is a schematic drawing of the above-mentioned the microphone circuit assembly 301 in accordance with a second embodiment of the present invention. The present microphone circuit assembly 301 comprises a speech recognition unit 306 which may be identical to the above-discussed speech recognition unit 206 of the first embodiment. The present microphone circuit assembly 301 additionally comprises a bi-directional data communication interface 322 which may be identical to the bi-directional data communication interface 222 of the first embodiment. The skilled person will understand that functionality of the speech recognition unit 306 and the bi-directional data transmission interface 322 may be identical to the above discussed functionality of the corresponding circuits of the first embodiment.

The present microphone circuit assembly 301 comprises a signal conditioner including a microphone preamplifier 310 and an analog-to-digital converter 312 of the over-sampled sigma-delta type with respective programmable or configurable power consumption and audio performance. The respective programmable settings of the microphone preamplifier 310 and an analog-to-digital converter 312 are defined by respective parameter values held in a configuration register. The configuration register is preferably arranged in, or at least readable from, a controller (not shown). The controller may be integrated with the speech recognition unit 306. Configuration data comprising the parameter values of the programmable settings may be defined by configuration data received through the bi-directional data transmission interface 322. This feature allows the external application processor to set and modify the respective programmable settings of at least one of the microphone preamplifier 310 and analog-to-digital converter 312 in accordance with system requirements. In alternative embodiment, the controller of the microphone circuit assembly 301 may be configured to perform the setting and modification of the respective programmable settings of a signal conditioner comprising the microphone preamplifier 310 and analog-to-digital converter 312.

By utilizing the programmable settings, the controller is configured to provide a first power mode and a second power mode of the microphone preamplifier 310 and analog-to-digital converter 312 leading to the same power modes of the microphone circuit assembly 301. The first power mode may be a low-power mode or reduced performance mode of the circuit assembly 301 suitable for wake-up system applications as discussed above. The controller of the microphone circuit assembly 301 may be configured to switch from the low-power mode to the second power mode in response to the recognition of the target word or phrase. The second power mode may be a nominal performance mode in which the microphone signal samples are generated with a larger dynamic range and/or higher sampling rate than in the low-power mode albeit at the expense of increased power consumption of the signal conditioner. The advantage of this switchable power mode feature is that the power consumption of the microphone circuit assembly 301 is very low when the system resides in sleep-mode awaiting a predetermined voice or speech command to switch to normal operation. The lower performance of the signal conditioner in the low power mode has on the other hand no negative influence on the microphone signal during normal operation because the signal conditioner (comprising the microphone preamplifier 310 and analog-to-digital converter 312) is switched to the nominal performance mode. Even though the latter operation mode leads to increased power consumption, this effect may be largely inconsequential in many system configurations or set-ups because the external application processor, e.g. a high-speed programmable DSP, is likely to be the dominant source of system power consumption during normal operation or other peripheral system components like LCD displays etc. are likely to have significantly higher power consumption than the microphone circuit assembly 301. The dynamic range of the microphone signal samples may be smaller than 72 dB such as smaller than 66 dB, or smaller than 60 dB, in the low-power mode in exemplary embodiments of the microphone circuit assembly. The dynamic range of the digital microphone signal may be larger than 78 dB, preferably larger than 84 dB in the nominal performance mode of the microphone circuit assembly to allow for distortion free handling of high microphone sound pressure levels.

The dynamic range being measured as a signal to noise ratio plus THD of the microphone signal samples with a 1 kHz full scale microphone input signal relative to A-weighted noise level of the microphone signal samples with AC-shorted input terminal of the microphone preamplifier.

To further decrease power consumption in the low power mode of the microphone circuit assembly, the sample rate of the of the microphone signal samples generated by the analog-to-digital converter 312 may be set to a relatively low rate, compared to the nominal performance mode, such as 16 kHz or even less. The sample rate of the microphone signal samples generated by the analog-to-digital converter in the nominal performance mode may be set to rate equal to or higher than 32 kHz such as 44.1, 48 or 96 kHz.

In FIG. 3, the illustrated configuration data arrow 319 pointing to the microphone preamplifier 310 and analog-to-digital converter 312 schematically illustrate the programmable properties of these devices of the signal conditioner.

In the microphone preamplifier 310, the configuration data may change parameters such as DC bias current(s) of one or more amplification stages. In the analog-to-digital converter 312, the configuration data may change values of parameters like DC bias current(s) of one or more cascaded integrator stages, sampling frequency of the quantizer and/or a number of levels of the quantizer, characteristics of decimation filters 312a, 312b etc. The configuration parameters may also control an order of a modulator loop by deactivating/activating certain integrators of the cascade etc.

The skilled person will appreciate that the cited sample rates are those applied for the case of a non-oversampling ND converter architecture. For an oversampled ND converter architectures, in particular single-bit or multi-bit analog-to-digital converters of the sigma-delta type as the present one, the quoted sample rates are those of the decimated multi-bit output signal presented at the input of floating point converter 316. The quantizer itself of the sigma-delta converter will typically run at a much higher sampling rate or frequency such as between 2.0 MHz and 5.0 MHz.

The floating point converter 316 is inserted between the above-discussed output of the sigma-delta analog-to-digital converter 312 providing the microphone signal samples encoded in the decimated multi-bit format and the input of the MFCC filter bank (not shown) of the speech recognition unit 306. The format of the decimated multi-bit microphone signal samples is preferably a binary fixed-point format such as two's complement, binary off-set etc. Hence, the floating point converter 316 is configured to convert the microphone signal samples from the binary fixed point format into a proprietary or standardized binary floating point format before processing in the MFCC filter bank. In the present embodiment, the floating point converter 316 is configured to generate a proprietary binary floating point format utilizing a very small number of bits in each of the mantissa and exponent to minimize power consumption of the MFCC filter bank. The representation of the microphone signal samples in binary floating point format in the MFCC filter bank is a highly effective mechanism for reducing its power consumption. This is caused by the inherent block based processing of the MFCC filter bank comprising FFT/iFFT operations. Fixed point numbers in FFT based operations are disadvantageous because of the notorious high internal gain factor of the FFT. The present speech recognition unit 306 may comprise FFT operations with FFT block sizes ranging from 256 to 1024 microphone signal samples. These FFT block sizes may require between 8-10 guard bits to prevent internal overflow. The high internal gain of the FFT may accordingly lead to nearly a doubling of the required bit-widths of internal datapath circuitry, registers etc. of the MFCC filter bank if the microphone signal samples at the input of the MFCC bank is represented with about 10-12 bits of precision. The latter precision range corresponds approximately to the previously discussed 66-72 dB of dynamic range of the analog-to-digital converter 312. The proprietary floating point format utilized in the MFCC filter bank may advantageously be adapted such that resolution of the mantissa is largely matched to the dynamic range of the microphone signal samples delivered by the analog-to-digital converter 312 while the resolution of the exponent may be selected to largely match the internal gain associated with the selected FFT block size. The mantissa is therefore preferably represented by 16 bits or less, such as 12 bits or less, and the exponent is preferably represented by 8 bits or less such as 6 bits or less. In one specific embodiment of the proprietary floating point format, the mantissa is represented by 11 bits and the exponent is represented by 5 bits. Finally, the skilled person will appreciate that the use of the proprietary floating point format also simplifies computation of commonly encountered arithmetic or mathematical functions such as square roots and logarithms which are useful for certain processing steps performed in the MFCC filter bank.

Figure 4:
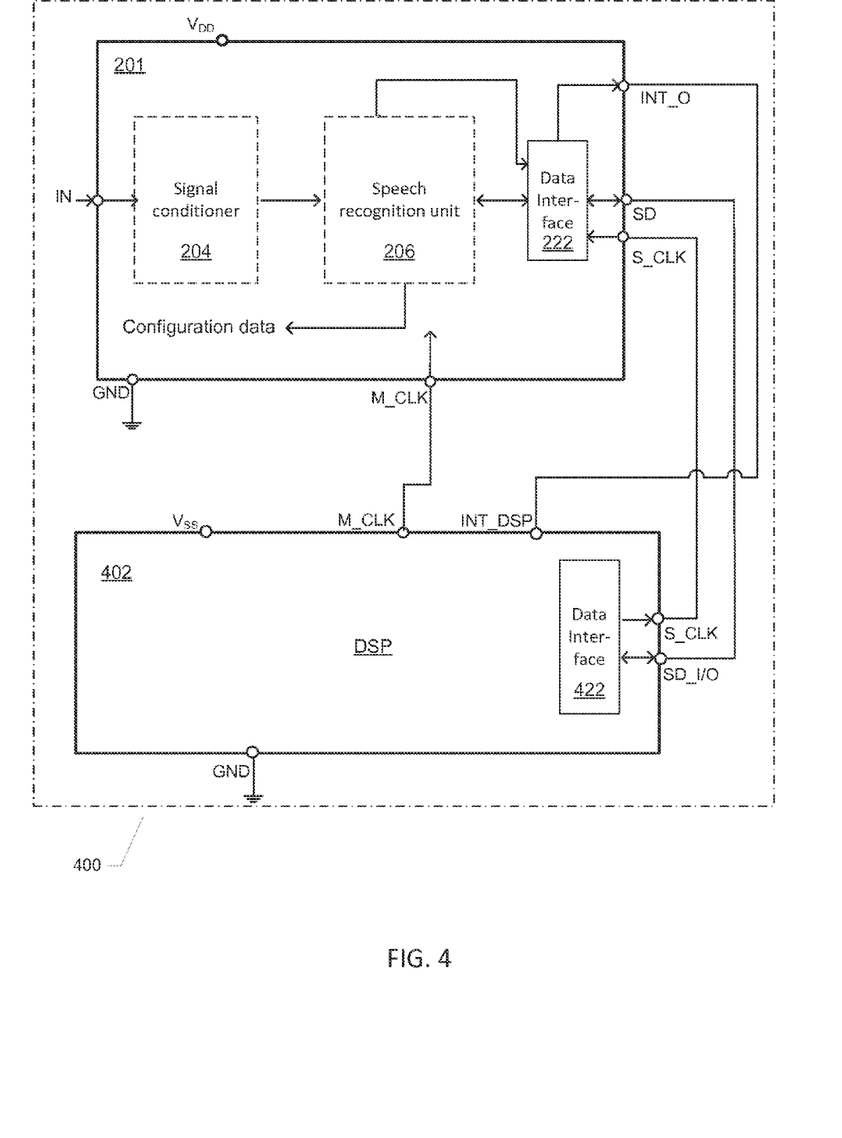
FIG. 4 is a schematic drawing of a Digital Signal Processing System comprising the microphone circuit assembly illustrated on FIG. 2 or FIG. 3 in accordance with another aspect of the present invention.

FIG. 4 is a schematic drawing of a Digital Signal Processing System 400 comprising the first embodiment of the present microphone circuit assembly 201 as illustrated in detail on FIG. 2 in accordance with separate aspect of the present invention. The Digital Signal Processing System 400 or DSP system comprises a software programmable Digital Signal Processor 402 operatively coupled to the microphone circuit assembly 201 via suitable electrical conductors. The skilled person will understand the software programmable DSP 402 and the microphone circuit assembly 201 may be attached and soldered to a suitable carrier such as a multi-layer printed circuit board. The software programmable DSP 402 may comprise an industry standard microprocessor core such as an ARM core integrated with peripheral circuits such as memory, I/O interfaces, DSP enhancements etc. The DSP system 400 may form part of a portable communication device such as a smartphone or a piece of home entertainment equipment such as a TV set. The software programmable DSP 402 may function as an application processor for the portable communication device or home entertainment equipment and comprise an off-the-shelf microprocessor. The software programmable DSP 402 comprises a bi-directional data interface 422 connected to the data transmission interface 222 of the microphone circuit assembly 201 via data wires or conductors arranged on or in the carrier. The bi-directional data communication interface 422 preferably comprises an industry standard type of serial data interface such as I²C, SPI, I²S etc. that is compatible with the previously discussed data interface 222 of the microphone circuit assembly 201. The bi-directional data interface 422 comprises externally accessible pins or terminals SD_I/O and S_CLK of the programmable DSP 402 coupled to corresponding externally accessible data interface pins or terminals SD and S_CLK of the microphone circuit assembly 201. The exchange of data through the bi-directional data interface is synchronized to a serial data clock signal supplied by the S_CLK terminal of the programmable DSP 402.

Power supply voltage is supplied to the microphone circuit assembly 201 through externally accessible terminals $V_{DD}$ and GND. The power supply voltage may be a DC voltage between 1.5 V and 3.0 V. Power supply voltage to the software programmable DSP 402 is supplied through externally accessible terminals $V_{SS}$ and GND. In the present embodiment, the software programmable DSP 402 is configured a master device for the microphone circuit assembly 201 and supplies a master clock signal thereto through terminals or pads M_CLK and M_CLKI. The master clock signal supplied to the microphone circuit assembly 201 may have a frequency between 1.0 MHz and 5.0 MHz. The master clock signal may be used as a clock source for the previously discussed sigma-delta analog-to-digital converter of the signal conditioner 204 and to clock digital logic of the speech recognition unit 206.

In an alternative embodiment, the microphone circuit assembly 201 comprises two independent clocking systems. A first clock system is based on an internal self-contained clock oscillator and generator which supply the master clock signal when the microphone circuit assembly 201 operates in its low power mode awaiting the predetermined voice or speech command. This relaxes clock signal generation capabilities of the software programmable DSP 402 during system power down. After power-up of the DSP system 400, a second clock system of the microphone circuit assembly 201 may be configured to detect a presence of a master clock signal on the terminal M_CLK supplied by the software programmable DSP 402. In response, the second clock system disables or overrides the internal self-contained clock generator and internally distributes the master clock signal on the M_CLK terminal generated by the DSP. In this manner, a beneficial synchronization between the clock signals of the software programmable DSP 402 and the clock signals of the microphone circuit assembly 201 is achieved during system operation in the nominal performance mode.

As mentioned above, the microphone circuit assembly 201 comprises the externally accessible output terminal or pad INT_O which is connected to an interrupt pin or terminal, INT_DSP, of the software programmable DSP 402. As previously explained the controller of the microphone circuit assembly 201 is configured to generate the recognition signal on INT_O in response to the recognition of a target word or target phrase of the incoming speech. In the present embodiment, this recognition signal triggers an interrupt in the software programmable DSP 402 through an input port coupled to the interrupt pin INT_DSP. The input port may be responsive to a rising or falling edge of the recognition signal or to a logic state thereof. When the microphone circuit assembly 201 functions as wake-up processor for the software programmable DSP 402, the latter may advantageously reside in the previously discussed sleep mode where certain circuit modules such as the bi-directional data interface 422, datapath, clock networks and generators etc. are rendered inactive to minimize power consumption. Hence, the software programmable DSP 402 may unable to receive or process the microphone signal samples. Likewise, the processing of other signals than the microphone signal for example signals supplied by other peripheral circuits or devices (not shown) of the DSP system 400 is interrupted or cancelled. The software programmable DSP 402 may reside in this sleep-mode until it receives the recognition signal and in response switch from its sleep-mode to the active or normal operation mode. In the active mode, the software programmable DSP 402 will control operation of the Digital Signal Processing System 400 in accordance with stored program routines or applications. These program routines comprises respective sets of executable program instructions and may be stored in a suitable program memory area (not shown) of the software programmable DSP 402. Likewise, associated program data may be stored in a data memory accessible to the software programmable DSP 402.

The skilled person will understand that the data transmission interface 222 may be a dedicated digital audio interface configured to exclusively transmit the digital microphone samples to the software programmable DSP 402. This type of dedicated digital audio interface may comprise the industry standard I²S interface or a customized transmission interface e.g. based on PDM encoding of the microphone signal samples. According to this embodiment the recognition signal is transmitted via an independent separate data wire and pad INT_O as illustrated on FIG. 4. However, in alternative embodiments the data transmission interface 222 is configured to convey both digital audio and control data and therefore able to transmit both the digital microphone samples and the notification signal. The latter type of data transmission interface 222 may comprise industry standard interfaces such as SLIMbus or SPI.

The skilled person will understand that the above-discussed recognition signal from the microphone circuit assembly 201 may be provided to the software programmable DSP 402 in numerous other ways. The recognition signal may for example comprise a certain data command transmitted through the data transmission interface 222 and the bi-directional data interface 422 of the software programmable DSP 402. In this embodiment, the software programmable DSP 402 may reside in the active mode executing a suitably configured application program such as the below described speech recognition application for processing and responding to the received data command.

In an alternative embodiment, the software programmable DSP 402 and the microphone circuit assembly 201 are placed on a common semiconductor die albeit on separate voltage islands or domains. The use of the separate voltage islands or domains allows the software programmable DSP 402 to be fully powered. In this embodiment, the externally accessible output terminal INT_O is replaced by a corresponding pad and interconnection wire arranged on the common semiconductor die allowing the microphone circuit assembly 201 to transmit the recognition signal to the DSP 402 across a voltage barrier surrounding the voltage island.

According to a preferred embodiment of the Digital Signal Processing System 400, the software programmable DSP 402 comprises a speech recognition application or program routine comprising a set of executable program instructions configured to, in response to receipt of the recognition signal, read the previously discussed selected speech segment transmitted by the microphone circuit assembly 201 through the bi-directional data interface 422. The selected speech segment comprises microphone signal samples comprising the target word of phrase as recognized by the speech recognition unit 206. The purpose of the speech recognition application is inter alia to verify the previous recognition of the target word or phrase performed by the speech recognition unit 206 of the microphone circuit assembly 201. This is useful for numerous reasons for example to improve the speech recognition performance of the Digital Signal Processing System 400 by rejecting erroneous target word recognitions of the speech recognition unit 206. The speech recognition algorithm executed by the speech recognition application running on the software programmable DSP 402 may be substantially more sophisticated than the corresponding algorithm implemented, in hardware or software, on speech recognition unit 206. This higher degree of sophistication of the speech recognition algorithm executable or running on the software programmable DSP 402 may be feasible because the latter lacks the severe power consumption constraints imparted to the speech recognition unit 206. These power consumption constraints may lead to certain circuit limitations and accompanying performance limitations in various signal processing circuits of the speech recognition unit 206 such as internal word lengths, memory space utilization, FFT block size etc. of the MFCC filter bank: Likewise, the power consumption constraints may limit available computing resources in the controller 226 to perform the most sophisticated type of analysis of the speech vectors received from the MFCC filter bank 218.

If the speech recognition application executing on the software programmable DSP 402 verifies that the analysed speech segment indeed comprises the target word or phrase, the speech recognition application preferably retains the active mode of the software programmable DSP 402 and may proceed to wake-up and/or initialize various peripheral components and circuits in accordance with a program instructions of an operating system. The speech recognition application may for example transmit certain configuration data to the controller of the microphone circuit assembly 201 through the data interfaces 422, 222. These configuration data are utilized by the controller to switch the microphone circuit assembly 201 from the low power mode to the nominal performance mode as previously discussed in connection with FIG. 3. In response to activation of the nominal performance mode, the microphone circuit assembly 201 begins to transmit microphone signal samples with higher dynamic range, and possibly larger bandwidth, to improve the perceptual quality of the microphone signal supplied to the software programmable DSP 402 for the benefit of the user of portable communication devices.

In one embodiment of the invention, the speech recognition unit 206 of the microphone circuit assembly 201 remains active in the active mode of the software programmable DSP 402 despite the execution of a corresponding speech recognition application thereon. This may be advantageous for various reasons for example because the speech recognition unit 206 may act as a pre-filter for the speech recognition application such that the speech recognition application solely processes speech segments flagged by the speech recognition unit 206 as comprising target words and/or phrases. In this manner, the speech recognition application executed by the software programmable DSP 402 can discard the processing of large amounts of incoming microphone signal samples supplied by the microphone circuit assembly 201. This feature leads to a beneficial reduction of computational load and power consumption of the software programmable DSP 402. This embodiment will typically require the reference word and phrase vocabulary (FIG. 2 item 224) comprises more than a single target word or phrase which may be sufficient for an embodiment providing only wake-up functionality to the system.

In an alternative embodiment of the invention, the speech recognition unit 206 of the microphone circuit assembly 201 is deactivated once the software programmable DSP 402 has entered its active mode while the signal conditioner remains active and transmits microphone signal samples representing the incoming sound including speech to the software programmable DSP 402. Hence, the speech recognition application running on the software programmable DSP 402 may continue to analyse the microphone signal samples to recognize target words or phrases. The deactivation of the speech recognition unit 206 may for example be effected by the controller of the microphone circuit assembly 201 after recognition of the target word or phrase or effected by the software programmable DSP 402 transmitting suitable configuration data to the controller. Hence, this embodiment of the microphone circuit assembly 201 is particularly well-suited for system wake-up functionality and the reference word and phrase vocabulary (FIG. 2 item 224) may be limited to only a single or few target word(s) or phrase(s) representing a short wake-up command. The wake-up command could be 'turn on' or 'power up' etc. leading to low memory usage of the reference word and phrase vocabulary to lower the fabrication costs of the microphone circuit assembly 201.

The invention claimed is:

1. A method, comprising:
    buffering audio samples received from a microphone,
    performing speech recognition on the buffered audio samples using a locally-stored vocabulary as a reference, and
    when the speech recognition identifies a recognized speech element, outputting a wake up signal indicating a match and outputting buffered audio signals corresponding to the recognized speech element,
    wherein at least one of the buffering, the performing, and the outputting is performed at least in part by a processor.

2. The method of claim 1, further comprising outputting the buffered audio signals received subsequent to the buffered audio signals that correspond to the recognized speech element.

3. The method of claim 2, further comprising:
    performing second speech recognition on the outputted buffered audio signals, both those corresponding to the recognized speech element and those received subsequent to the buffered audio signals that correspond to the recognized speech element,
    wherein the second speech recognition is more sophisticated than the speech recognition performed using the locally-stored vocabulary.

4. The method of claim 1, wherein outputting of buffered audio signals is prevented before the speech recognition identifies the recognized speech element.

5. The method of claim 1, wherein the outputting of the buffered audio signals corresponding to the recognized speech element occurs after receiving an acknowledgment of the wake up signal.

6. The method of claim 1, further comprising deactivating the performing speech recognition after the speech recognition identifies the recognized speech element, and outputting buffered audio signals received subsequent to the buffered audio signals that correspond to the recognized speech element.

7. The method of claim 1, further comprising:
    generating the audio samples from an input audio signal, wherein,
        before the speech recognition identifies the recognized speech element, the generating occurs at a first sampling rate, and
        after the speech recognition identifies the recognized speech element, the generating occurs at a second sampling rate higher than the first sampling rate.

8. The method of claim 1, further comprising:
    generating the audio samples from an input audio signal, wherein,
        before the speech recognition identifies the recognized speech element, the samples have a first dynamic range, and
        after the speech recognition identifies the recognized speech element, the samples have a second dynamic range higher than the first dynamic range.

9. A system, comprising:
    a buffer to store samples representing an input audio signal,
    a speech feature extractor having an input for samples from the buffer,
    a speech vocabulary storing data representing a predetermined set of speech elements, and
    a controller comprising a decision circuit to generate a wake up signal in response to a match between speech features output by the extractor and the stored speech elements, wherein the controller is configured to output a wake up signal indicating the match and to output samples received subsequent to the samples stored in the buffer corresponding to the match.

10. The system of claim 9, further comprising a speech recognition system, responsive to the wake up signal, to transition from a low power mode to a high power mode and perform speech recognition on samples representing the input audio signal.

11. The system of claim 10, wherein the speech vocabulary stores a fewer number of speech elements than can be recognized by the speech recognition system.

12. The system of claim 10, wherein the speech recognition system is provided on an integrated circuit die separate from another integrated circuit die that includes the buffer, the speech feature extractor, the speech vocabulary and the controller.

13. The system of claim 10, wherein the buffer, the speech feature extractor, the speech vocabulary, the controller, and the speech recognition system are provided on a common integrated circuit die.

14. The system of claim 9, further comprising a data interface to output stored samples corresponding to the match.

15. The system of claim 9, further comprising an analog-to-digital converter (ADC) to generate the samples, the ADC operative in at least:
a first power mode wherein the ADC generates samples at a first sample rate, and
a second power mode wherein the ADC generates samples at a second sample rate, higher than the first sample rate.

16. The system of claim 9, further comprising an analog-to-digital converter (ADC) to generate the samples, the ADC operative in at least:
a first power mode wherein the ADC generates samples at a first dynamic range, and
a second power mode wherein the ADC generates samples at a second dynamic range, higher than the first dynamic range.

17. The system of claim 9, wherein the buffer is a circular buffer having a capacity between 500 ms and 1 second of audio samples.

18. A non-transitory computer readable medium storing program instructions that, when executed by a processing device, causes the device to:
buffer input audio samples,
perform speech recognition on the buffered audio samples using a vocabulary as a reference, and
when the speech recognition identifies a recognized speech element, generating a wake up command indicating a match;
wherein the instructions further cause the device to output the wake up command and to output audio samples received subsequent to the buffered audio samples that correspond to the recognized speech element.

19. The medium of claim 18, wherein the instructions further cause the device to:
responsive to the wake up command, instantiate a second speech recognition process by the device, the second speech recognition process operating on the buffered audio samples that correspond to the recognized speech element and audio samples that follow the audio samples that correspond to the recognized speech element,
wherein the second speech recognition process is more sophisticated than the speech recognition performed using the vocabulary.

20. The medium of claim 18, wherein the instructions further cause the device to deactivate the performing speech recognition after the speech recognition identifies the recognized speech element.

21. The system of claim 9, further comprising:
a microphone to capture the input audio signal,
a preamplifier coupled to the microphone, and
an analog to digital converter coupled to the preamplifier having an output in communication with the buffer.

22. The method of claim 1, wherein the performing the speech recognition on the buffered audio samples includes identifying a target word or target phrase from the buffered audio samples, and wherein the recognized speech element includes the target word or target phrase.

23. The method of claim 3, wherein the speech recognition performed using the locally-stored vocabulary is limited by one or more of a processor word length, a memory usage characteristic, or an FFT block size, and wherein the more sophisticated second speech recognition is less limited by a corresponding and respective one of the processor word length, memory usage characteristic, or FFT block size.

24. The method of claim 3, wherein the speech recognition performed using the locally-stored vocabulary is performed by a processor circuit under a first power consumption constraint, and wherein the more sophisticated second speech recognition is performed using the same or a different processor circuit under a second and less restrictive power consumption constraint.

25. The system of claim 9, wherein the speech vocabulary stores data representing one or more of a target word or target phrase, and wherein the decision circuit is configured to generate the wake up signal in response to a match between speech features output by the extractor and the one or more of the target word or target phrase.

26. The system of claim 9, further comprising a speech recognition system, responsive to the wake up signal, to verify the match using the speech features output by the extractor and the same or different stored speech elements.

27. The system of claim 9, wherein the buffer is a circular buffer circuit, wherein the speech feature extractor includes a Mel Factor Cepstrum Coefficient (MFCC) filter bank, and wherein the circular buffer circuit stores blocks of audio signal samples for analysis by the MFCC filter bank.

28. The system of claim 9, further comprising a portable communication device that includes the buffer, the speech feature extractor, the speech vocabulary, and the controller.

29. The medium of claim 18, wherein the vocabulary includes one or more of a target word or target phrase.

30. The medium of claim 18, wherein the instructions further cause the device to:
responsive to the wake up command, instantiate a second speech recognition process by the device, the second speech recognition process configured to verify that the recognized speech element is present in the buffered audio samples.

31. The medium of claim 19, wherein the speech recognition performed using the vocabulary is limited by one or more of the processing device's word length, memory usage characteristic, or FFT block size, and wherein the more sophisticated second speech recognition process is less limited by a corresponding and respective one of the word length, memory usage characteristic, or FFT block size of the same or a different processing device.

32. The medium of claim 19, wherein the speech recognition performed using the vocabulary is performed by the processing device under a first power consumption constraint, and wherein the more sophisticated second speech recognition is performed using the same or a different processing device under a second and less restrictive power consumption constraint.

33. A method, comprising:
receiving a digital audio signal;
buffering audio samples from the received digital audio signal;
performing speech recognition on the buffered audio samples, using a locally-stored vocabulary as a reference, to recognize a target word or target phrase in the buffered audio samples; and
when the speech recognition identifies the target word or target phrase in the buffered audio samples, outputting a wake up signal indicating a recognition match and outputting audio samples received subsequent to the buffered samples corresponding to the recognition match;
wherein at least one of the receiving, the buffering, the performing, and the outputting is performed at least in part by a first processor circuit.

34. The method of claim 33, further comprising receiving the wake up signal at a second processor circuit and, using the second processor circuit, verifying the speech recognition performed at least in part by the first processor circuit.

35. The method of claim 33, further comprising receiving the wake up signal at a second processor circuit and, in response to receiving the wake up signal, waking the second processor circuit and/or a device associated with the second processor circuit from a power-saving mode to execute a response to the wake up signal.

36. A mobile system for speech recognition, the system comprising:
a buffer circuit configured to store audio samples from an input audio signal;
a memory circuit including speech data representing a target word or target phrase;
a speech feature extractor circuit configured to receive audio samples from the buffer circuit and output corresponding speech features; and
a controller circuit configured to generate and output a wake up signal when the speech features output by the extractor circuit correspond to the speech data representing the target word or target phrase, and the controller circuit is further configured to output audio samples received subsequent to the stored audio samples corresponding to the target word or target phrase.

37. The system of claim 36, further comprising:
an application processor circuit configured to receive the wake up signal from the controller circuit and, in response, verify that the audio samples from the buffer circuit correspond to the target word or target phrase.

38. The system of claim 36, wherein the controller circuit is configured to operate in multiple different power consumption modes, wherein:
in a first power consumption mode, the controller circuit is configured to generate the wake up signal, and
in a different second power consumption mode, the controller circuit is configured to verify that the audio samples from the buffer circuit and/or the speech features output by the extractor circuit correspond to the speech data representing the target word or target phrase.

* * * * *